(12) United States Patent
Shinmoto

(10) Patent No.: US 6,254,368 B1
(45) Date of Patent: Jul. 3, 2001

(54) PLASTIC MOLDING MACHINE

(75) Inventor: Jitsumi Shinmoto, Tokyo (JP)

(73) Assignee: Tomy Machinery Manufacturing Col., Ltd., Tokyo (JP)

( * ) Notice: Subject to any disclaimer, the term of this patent is extended or adjusted under 35 U.S.C. 154(b) by 0 days.

(21) Appl. No.: 08/339,980

(22) Filed: Nov. 14, 1994

Related U.S. Application Data

(63) Continuation of application No. 07/870,942, filed on Apr. 20, 1992, now abandoned.

(51) Int. Cl.[7] .................................................. B29C 47/92
(52) U.S. Cl. ..................... 425/72.1; 264/40.3; 425/140; 425/145; 425/326.1; 425/387.1
(58) Field of Search ................ 425/72.1, 326.1, 425/387.1, 140, 145; 264/40.2, 40.3

(56) References Cited

U.S. PATENT DOCUMENTS

| | | | |
|---|---|---|---|
| 4,201,741 | * | 5/1980 | Pannenbecker .................. 425/72.1 X |
| 4,243,363 | * | 1/1981 | Mulcahy ......................... 425/72.1 X |
| 4,246,212 | * | 1/1981 | Upmeier et al. .................. 425/140 X |
| 4,355,966 | * | 10/1982 | Sweeney et al. ................ 264/40.2 X |
| 4,402,656 | * | 9/1983 | Schott, Jr. ....................... 264/40.2 X |
| 4,606,879 | * | 8/1986 | Cerisano ......................... 425/72.1 X |
| 4,931,003 | * | 6/1990 | Van Erden ....................... 425/72.1 X |
| 4,938,903 | * | 7/1990 | Schaeffer et al. ............... 425/72.1 X |
| 5,124,094 | * | 6/1992 | Lenius et al. ....................... 264/40.2 |
| 5,179,521 | * | 1/1993 | Edge ................................ 264/40.3 X |
| 5,213,725 | * | 5/1993 | Lee et al. ........................ 425/72.1 X |
| 5,258,148 | * | 11/1993 | Sensen et al. ...................... 264/40.2 |
| 5,281,375 | * | 1/1994 | Konermann .......................... 264/40.3 |
| 5,288,219 | * | 2/1994 | Smith ................................... 425/72.1 |

* cited by examiner

Primary Examiner—Richard L. Chiesa
(74) Attorney, Agent, or Firm—Charles N. Quinn, Esq

(57) ABSTRACT

Apparatus for producing plastic film by extrusion includes a plastic extrusion machine having an extrusion screw, a motor for turning the screw, a die connected to the screw barrel outlet, a manifold having an opening receiving the die, a blower delivering cooling air to the manifold, and an infared emitter and detector for monitoring phase transition of the molten plastic material into solidified plastic film in adjusting operation of the apparatus to maintain plastic material phase transition occurrence in a preselected position downstream of the die by either adjusting speed of the blower or adjusting speed of the motor or both.

3 Claims, 2 Drawing Sheets

PLASTIC MOLDING MACHINE

This application is a continuation of application Ser. No. 07/870,942 filed on Apr. 20, 1992, now abandoned.

DETAILED DESCRIPTION OF THE INVENTION

The present invention relates to a plastic molding machine and more particularly a plastic molding machine which can maintain the frost line of a plastic product when molten plastic which is supplied from an extruding machine is emerged from a discharge opening to form plastic products having a predetermined film or the like.

BACKGROUND OF THE INVENTION

In general, in the conventional extruding machines, a plastic such as a thermoplastic resin is melted while being transported by a screw conveyor within a closed cylinder and the molten plastic is extruded toward a die having a predetermined opening and ejected through the opening to form a plastic product having a desired shape.

FIG. 3 shows a conventional plastic molding machine of the type described above. A hopper for feeding a predetermined plastic powder into the cylinder of an extrusion machine 1 is mounted thereon and with the interior of the extrusion machine 1 has a screw conveyor 4 for transporting the plastic powder supplied from the hopper 2 toward a head 3 and a heater (not shown) for melting the plastic powder being transported by the screw conveyor 4 toward the ejection opening of the head 3.

The extrusion opening of the head 3 of the extrusion machine 1 is connected to an L-shaped feed pipe 5 and a feeding opening 7 of a die 6 for forming,for example, tubular plastic products is detachably connected to the leading end of the feed pipe 5. An annular emerging opening 9 for emerging the molten plastic 8 so as to form a tubular plastic product is formed through the upper surface of the die 6. Furthermore, defined at the lower portion of the die 6 is an air injection opening 11 for expanding and maintaining the shape of the molded product in the form of a tube. An annular cooling air supply device 12 is disposed upwardly of the ejection opening 9 of the die 6 adjacent to the upper portion of the die 6. The cooling air supplied from a blower (not shown) is injected through the ejection opening 9 into the tubular plastic product 8, thereby cooling the same.

A plurality of guide rollers 13 are disposed upwardly of the cooling air supply device 12 so that the cooled tubular plastic product can be gradually made into the form of a flat laminated sheet. Disposed upwardly of the uppermost guide roller pair is a pair of pinch rollers 14 for pulling up the flatly laminated plastic product 8. A winding roller 15 for winding the flatly laminated plastic product 8 is disposed at the downstream side of the uppermost guide roller pair 13.

With the conventional plastic forming machine with the above-described construction, the predetermined plastic powder 8 is fed into the extrusion machine 1 through the hopper 2 and is melted while being transported by the screw conveyor 4. Thereafter, the molten plastic is forced to emerge through the opening of the head 3 and then fed into through the feed pipe 5 into the inlet opening 7 of the die 6. The die 6 forms the molten plastic 8 into a tubular shape, which is discharged from the emerging opening 9 upwardly. In this case, the air is fed into the die 6 through the air supply opening 7 and injected at a predetermined pressure level through the air injection opening 11 into a tubular plastic product 8 so that the product 8 is expanded and maintained in a predetermined shape. The emerged plastic product 8 is cooled by the cooling air injected from the cooling air supply device 12 so that the plastic product 8 is cooled and then gradually laminated by the guide rollers 13 into a flat shape. The laminated plastic product 8 thus formed is pulled up by the pinch roller pair 14 and then wound around the winding roller 15.

THE PROBLEMS WHICH THE PRESENT INVENTION CONTEMPLATES TO SOLVE

With the conventional plastic molding machine of the type described above, when the plastic product 8 emerged from the emerging opening 9 of the die 6 is cooled by the cooling air supply device 12 and becomes to have a maximum diameter at which a frost line 16 is formed. The temperature of the plastic product 8 below the frost line 16 ranges from 100 to 120° C. while the temperature of the plastic product 8 above the frost line 16 drops by 5–15° C. below the temperature of the plastic product 8 below the frost line 16. Depending upon the position of the frost line 16, the maximum diameter, the thickness and the like of the plastic product 8 vary so that it is desired that the position of the frost line 16 is maintained at a constant level.

However, there has been a problem that the position of the frost line 1 is moved upwardly or downwardly due to the variations in temperature between the day and night time and between summer and winter, More specifically, when the outside temperature is high, the rate of solidification or hardening of the plastic product 8 becomes low so that the frost line 16 moves upward. As a result, the thickness of the plastic product 88 is not uniform and furthermore the plastic product 8 swings between the die 6 and the guiderollers 13 so that it becomes instable and consequently the quality of the plastic products 8 are degraded. On the other hand, when the outside temperature is low, the rate of solidification or hardening of the plastic product 8 becomes higher so that the frost line moves downward, resulting the reduction of the diameter of the plastic product 8 and the degradation of quality there of as in the case of the low outside temperature.

In order to solve the above-described problems, so far the quantity of a plastic to be discharged is manually controlled and the flow rate of the cooling air supplied from the cooling air supply device 12 is also manually adjusted so that the frost line 16 can be moved upwardly or downwardly. The above and other problems, therefore, have been the obstructions when the automatic molding of the plastic products is desired.

BRIEF SUMMARY OF THE INVENTION

The present invention, therefore, was made to solve the above and other problems encountered in the conventional plastic molding machines and has for its object to provide a plastic molding machine which can always maintain the frost line at a predetermined level and which can automtically produce plastic products with the same quality.

According to the present invention, plastic powder is melted by an extrusion machine and transported the plastic thus melted toward a die. The melted plastic is molded into a desired shape and is forced out through an ejection opening of the die. Thereafter the molded plastic product is cooled by the cooling air supplied from a cooling air supply device. The level of the frost line is continuously detected by a frost line sensor and when the frost line is not maintained at a predetermined level, a control device controls the quantity of plastic powder to be supplied into the extrusion machine and/or the flow rate of the cooling air supplied from the cooling air supply device so as to move upwardly or downwardly the frost line, whereby the frost line can be always maintained at a predetermined level.

The plastic molding machine with the above-described construction in accordance with the present invention can automatically detect the frost line of a molded plastic semiproduct and can maintain the frost line always at a predetermined level without any manual control. Therefore the plastic products with the same quality can be automatically molded so that the quality of the plastic products can be remarkably improved.

BRIEF DESCRIPTION OF THE DRAWINGS

Same reference numerals are used to designate similar parts throughout figures.

DETAILED DESCRIPTION OF THE PREFERRED EMBODIMENT

Figure 1:
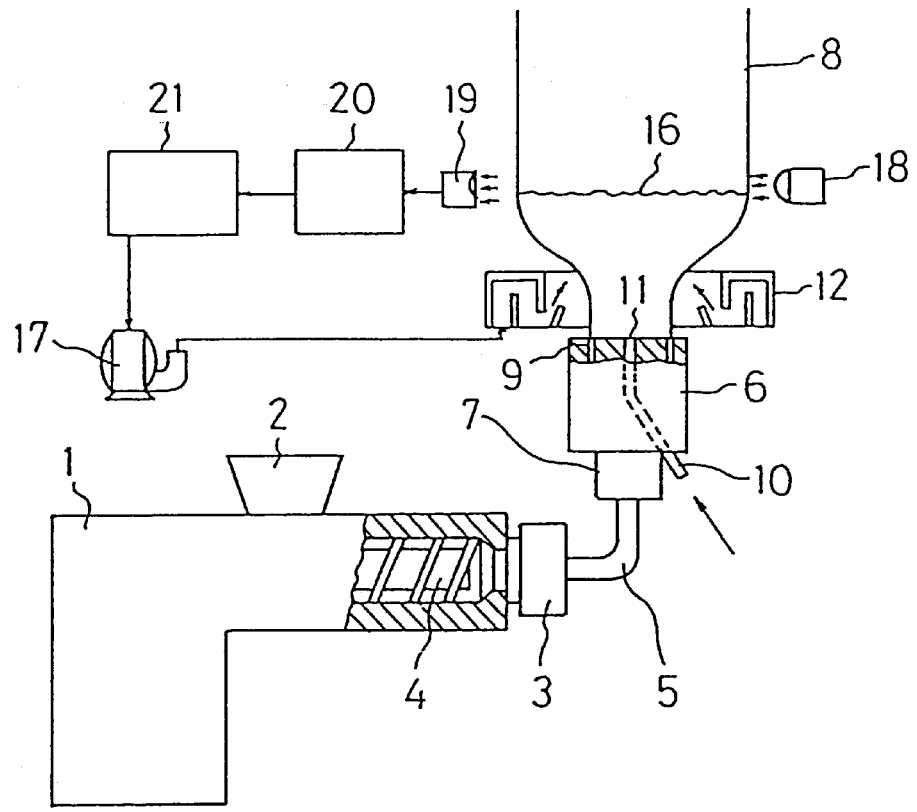
FIG. 1 is a partial schematic view of an embodiment of a plastic molding machine in accordance with the present invention.
Figure 2:
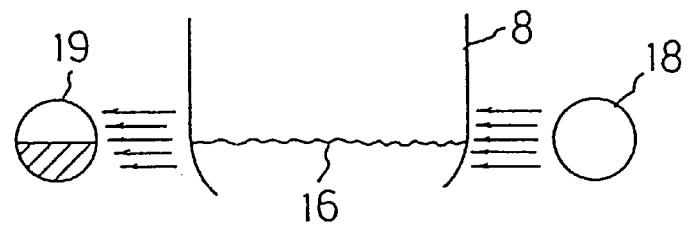
FIG. 2 a view to explain the infrared rays which are transmitted through a molded plastic semiproduct.
Figure 3:
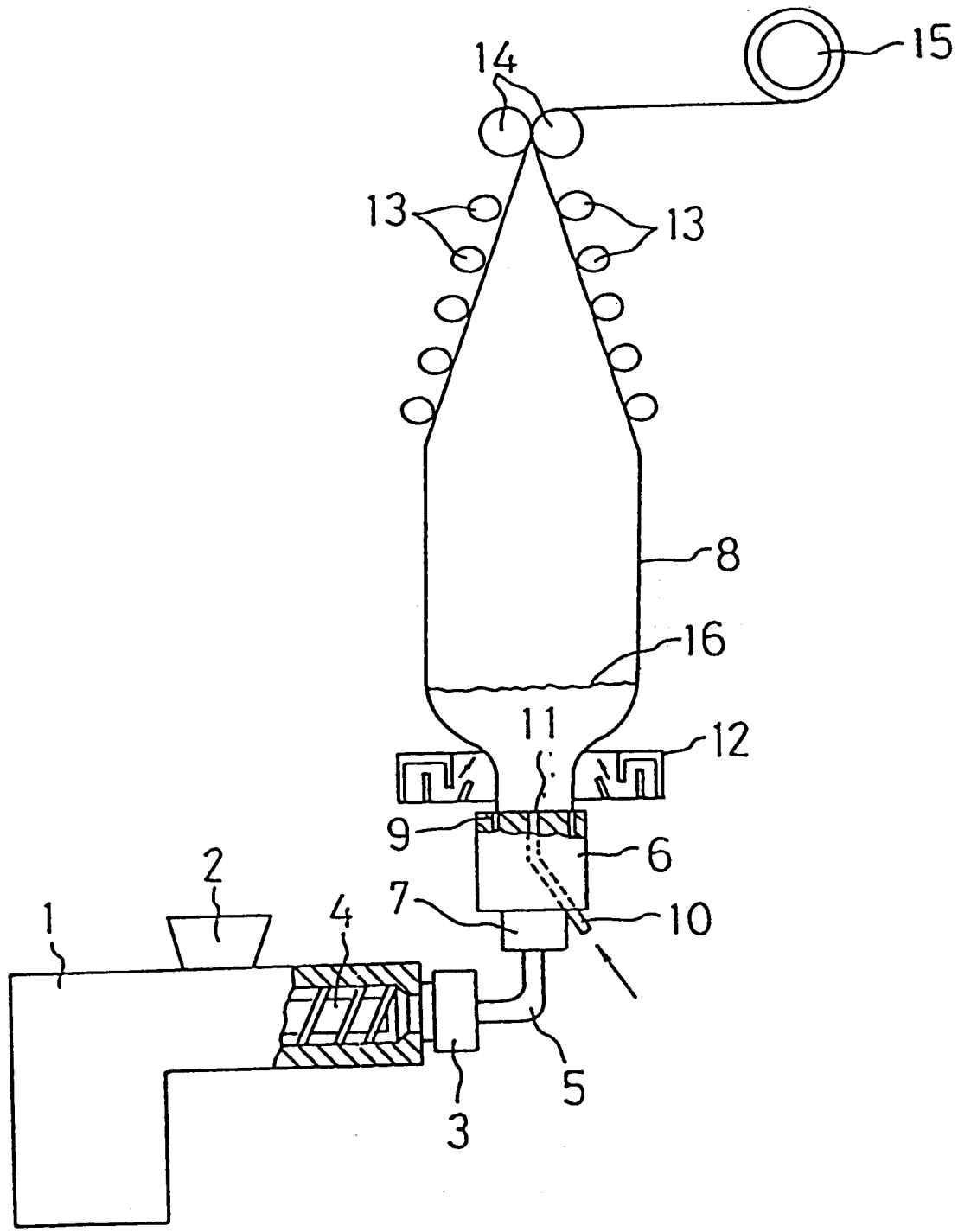
FIG. 3 is a view schematically illustrating a conventional plastic molding machine.

Referring now to FIGS. 1 and 2 illustrating a plastic molding machine in accordance with the present invention, a hopper 2 for supplying a predetermined quantity of plastic powder 8 into the extrusion machine 1 is mounted thereon and a screw conveyor 4 for transporting the plastic powder 8 toward a head 3 and a heater (not shown) are disposed within the extrusion machine 1. The discharge opening of the head 3 of the extrusion machine 1 is connected through a feed pipe 5 is detachably connected to the inlet opening 7 of, for instance, a thin walled tube molding die 6. The upper surface of the die 6 is formed with a circular opening 9 for molding a thin-walled tube and an expanding and cooling air injection opening 11 through which the air for expanding and cooling the molded plastic semiproduct 8 is injected therein. An annular cooling air supply device 12 is disposed around the outer periphery of the discharge opening 9 of the die 6 adjacent to the upper end thereof. The cooling air supply device 12 is blower 17 for supplying the cooling air for expanding and cooling the molded plastic semiproduct 8 discharged through the discharge opening 9.

Arranged upwardly of the cooling air supply device 12 are a plurality of guide roll pairs (not shown) for gradually laminating the molded plastic semiproduct into a sheet and a winding roller (not shown) for winding a flatly laminated plastic product 8 therearound.

A frost line level sensor comprises an infrared ray emitting device 18 disposed upwardly of the cooling air supply device 12 at a level at which the frost line is produced and an infrared ray reception device 19 disposed in diagonally opposing relationship with the infrared ray emitting device 18f for receiving the infrared rays emitted from the infrared emitting device 18 and through the molded plastic semiproduct 8. Connected to the infrared reception device 19 is an arithmetic unit 20 for integrating the quantity of the infrared rays received by the infrared ray reception device 19, thereby determining the quantity of the transmitted infrared rays in the vicinity of the frost line 16 of the molded plastic semiproduct 8. the arithmetic unit 20 is connected to a control unit 21 which, in response to the output representative of the quantity of the infrared rays transmitted through the molded plastic semiproduct 8, detects the level of the frost line 16 and, furthermore to a control unit 21 which, in response to the level of the frost line 16 thus detected. controls the rotational speed of the blower 17.

Next the mode of operation of the embodiment described above will be explained in detail.

The plastic powder 8 is fed from the hopper 2 of the extrusion machine 1 and them melted by the heater (not shown) while being transported by the screw conveyor 4. The molten plastic 8 is discharged through the discharge opening of the head 3 and transported through the feed pipe 5 to the inlet opening 7 of the die 6. Thereafter the molten plastic 8 is discharged through the circular opening 9 of the die 6 upwardly to form a thin-walled tube 8 while the air is injected through the air supply opening 10 into the die 6. The air under a predetermined pressure is injected into the molded thin-wall tube 8 to expand the same. The blower 17 is driven at a predetermined rotational speed so that the cooling air is supplied to the cooling air supply device 12 from which the cooling air is injected into the expanded plastic semiproduct 8, thereby cooling the same discharged from the discharge opening 9 of the die 6.

In this case, the infrared rays are emitted from the infrared ray emitting device 18 at a predetermined time interval to the plastic semiproduct 8 and the infrared rays which are transmitted through the molded plastic semiproduct 8 are received by the infrared ray reception device 19. The arithmetic unit 20 calculates the quantity of the infrared rays received by the reception device 19 and in response to the quantity of the received infrared rays detected in the manner above, detects the level of the frost line 16.

When the frost line 16 thus detected is higher than a predetermined or reference level, the control unit 21 causes the blower to rotate at a higher speed so that the quantity of the cooling air supplied from the cooling air device 12 is increased. As result, the efficiency of cooling the tubular plastic semiproduct is increased, resulting in the drop of the frost line. On the other hand, the level of the frost line is lower than a predetermined level, the control unit 11 causes the blower 17 to rotate at a low speed so that the quantity of the cooling air injected from the cooling air supply device is decreased. Then, the efficiency of cooling the molded plastic semiproduct 8 is decreased and the frost line 16 is raised.

Therefore, according to the embodiment of the present invention, the level of the frost line of the molded plastic semiproduct 8 is satisfactorily detected and is always maintained at a predetermined level without the manual operation. As a result, the plastic products 8 with the same quality can be automatically molded or formed so that the quantity of the molded plastic products can be remarkably increased.

So far it has been described that the rotational speed of the blower 17 is controlled by the control unit 21 so that the level of the front line 16 can be always maintained at a predetermined level, but it is to be understood that the level of the frost line 16 can be maintained at a predetermined level by adjusting the quantity of the melted plastic 8 by controlling the rotational speed of the screw conveyor 4 of the extrusion machine. In the later case when the level of the frost line 16 is high, it suffices to decrease the rotational speed of the screw conveyor 4, thereby decreasing the quantity of the molten plastic 8 to be supplied is decreased. When the level of the frost line 16 is lower than a predetermined or reference level, the rotational speed of the screw conveyor 4 is increased so that the quantity of the molten plastic 8 to be supplied can be increased. Thus, the level of the frost line 16 can be maintained substantially at a predetermined level as described in the preferred embodiment. In this case, in response to the quantity of the molten plastic 8 supplied, the rotational speed of the winding roller can be suitably controlled so that slacking and extension of the molded plastic product can be prevented. Therefore, the winding of the plastic product can be satisfactorily carried out.

Furthermore, in order to maintain automatically the level of the frost line at a predetermined level, the control of the rotational speeds of the screw conveyor 4 of the extrusion machine 1 and of the blower 7 can be carried out simultaneously so that the precise and finer control can be carried out.

In the embodiment described above, the die has been described as a die for molding a thin-wall tube, but it is understood that, for example, a T die or the like can be used to form a thin film.

It is to be understood that the present invention is not limited to the above-mentioned embodiment and that various modifications can be effected as needs demand.

What is claimed is:

1. Apparatus for producing plastic film by extrusion, comprising:
    a. a plastic extrusion machine comprising:
        i. an extrusion screw within an extrusion barrel for providing molten plastic material at an extrusion head defining an outlet end of said barrel; and
        ii. a motor for turning said screw relative to said barrel and converting plastic resin from solid to viscous form;
    b. a die connected to said barrel outlet end for forming said plastic material into molten film upon exit therefrom;
    c. a manifold having a central opening receiving said die for channeling cooling air about said molten plastic material upon exit from said die;
    d. a blower for delivering cooling air to said manifold;
    e. means for collecting said film upon transition thereof from molten to solid phase downstream from said die;
    f. means for monitoring phase transition of said molten plastic into solidified plastic film and adjusting operation of said apparatus to maintain plastic material phase transition occurrence at a preselected position downstream of said die.

2. Apparatus of claim 1 wherein said phase transition monitoring and operation adjusting means further comprises:
    a. means for emitting infrared radiation towards said plastic material about said preselected position;
    b. means for detecting said emitted infrared radiation and integrating said detected amount to determine whether said phase transition occurrence has shifted from said preselected position; and
    c. means for controlling speed of said blower delivering cooling air to said manifold thereby to affect the rate of cooling of plastic material passing through said manifold and repositioning plastic material phase transition occurrence at said preselected position downstream of said die.

3. Apparatus of claim 1 wherein said phase transition monitoring and operation adjusting means further comprises:
    a. means for emitting infrared radiation towards said plastic material about said preselected position;
    b. means for detecting said emitted infrared radiation and integrating said detected amount to determine whether said phase transition occurrence has shifted from said preselected position; and
    c. means for controlling speed of said motor turning said screw thereby to affect the rate of passage of plastic material passing through said manifold and repositioning plastic material phase transition occurrence at said preselected position downstream of said die.

\* \* \* \* \*